Patented Feb. 28, 1928.

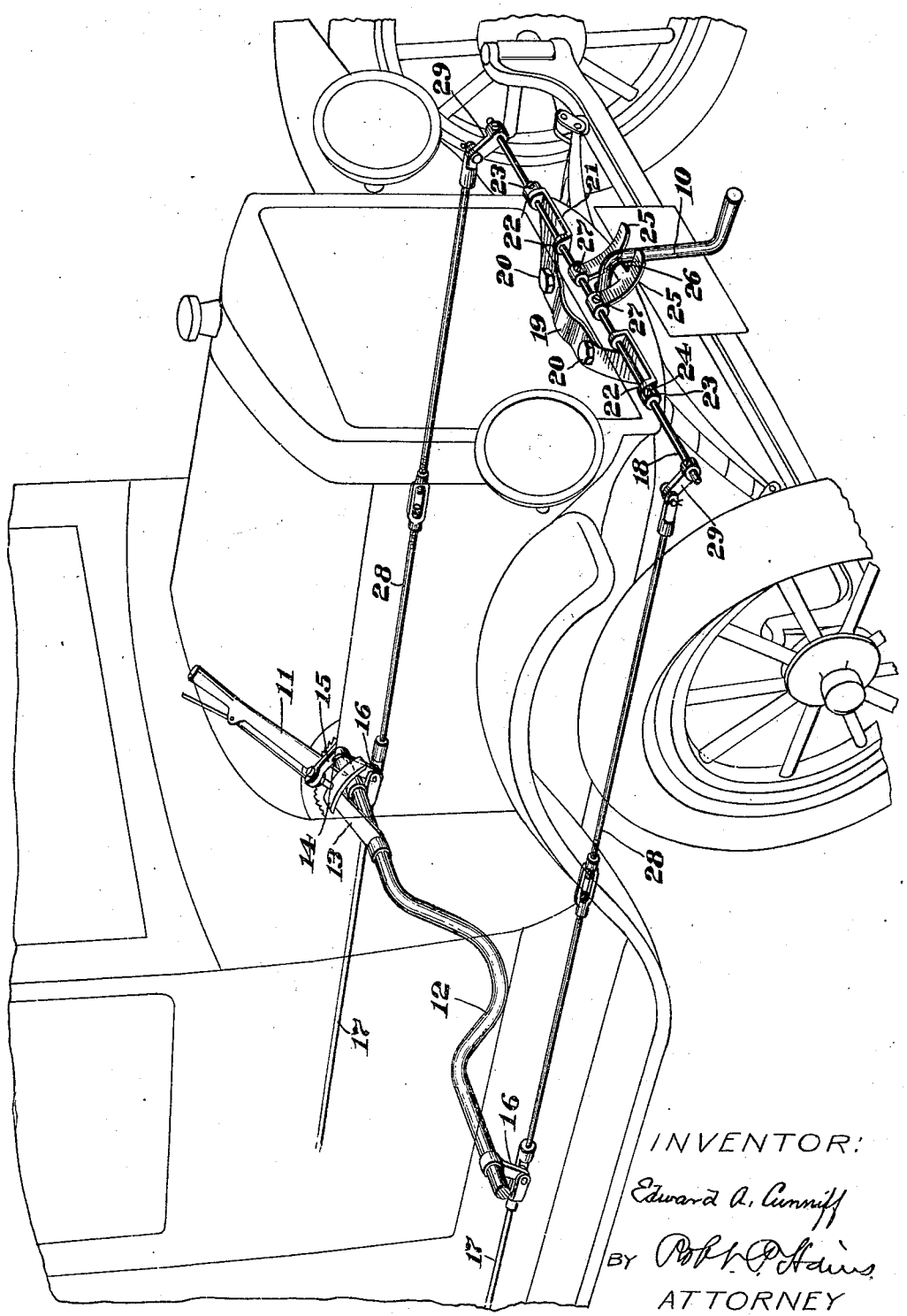

1,660,668

UNITED STATES PATENT OFFICE.

EDWARD A. CUNNIFF, OF WALTHAM, MASSACHUSETTS.

AUTOMOBILE ATTACHMENT.

Application filed May 24, 1927. Serial No. 193,934.

This invention relates to an automobile attachment for preventing the engine of the automobile from being cranked while the driving mechanism is operatively connected to the engine.

The crank for manually rotating the engine of an automobile is located at the front of the automobile in practically all makes of pleasure cars and trucks. It is therefore necessary to stand directly in front of the automobile to manually crank the engine to start the same, and if the engine is started while it is operatively connected to the wheel driving mechanism the person cranking the automobile is likely to be run over as the automobile is driven forward by its engine.

Many serious accidents have resulted in the manner above mentioned, due to the failure of the driver of the automobile to make sure that the engine is disconnected from the automobile driving mechanism before he cranks the engine. The present invention is therefore directed to an automobile attachment which is so constructed that it prevents the automobile from being cranked while the engine is operatively connected to the automobile driving mechanism.

The various features of the invention and novel combination of parts will be hereinafter described in connection with the accompanying drawing which illustrates one good practical form thereof.

The drawing consists of a perspective view of a well known make of automobile shown in light lines while the parts forming the subject matter of the present invention are shown heavier and shaded.

The automobile attachment illustrated is shown as applied to the Ford type of automobile employing the well known planetary drive for imparting the driving force of the engine to the rear wheels of the automobile, but it will be understood that the invention is not limited in use to this particular type of automobile.

The crank 10 shown at the front of the automobile serves to turn the engine over by hand in order to start the same, and it is normally pressed frontwardly by a spring which holds the shaft engaging end of the crank out of driving engagement with the power shaft of the automobile engine. The arrangement is such that when it is desired to crank the engine the crank 10 is pushed inwardly to engage its inner end with the power shaft of the engine in a well known manner.

The type of automobile shown is provided with an emergency brake lever 11 which is operatively secured to the brake actuating shaft 12 that extends transversely of the automobile beneath the floor thereof, and this shaft is journaled in supporting brackets for rocking movement. The brake operating lever 11 is shown in the position it occupies when the emergency brakes are released; that is, this lever is shown in the position it occupies when the automobile is being driven. The emergency brakes are applied by pulling the lever 11 rearwardly to approximately a vertical position; this rearward movement of the lever 11 not only applies the emergency brakes, but serves also to release the automobile driving mechanism from the engine so that the latter may rotate without driving the automobile. The releasing of this driving mechanism is effected by the cam arm 13 secured to the brake actuating shaft 12 and at the outer end of the arm 13 is provided the camming member 14 which serves to force a rocking arm 15 upwardly as the lever 11 is moved to the brake applying position.

The elevation of the lever 15 serves to release the automobile clutch. The brake actuating shaft 12 is provided with the downwardly extending arms 16 to the lower ends of which are secured the rods 17 that actuate the brake bands upon the rear wheels of the automobile.

The mechanism so far described constitutes part of the usual equipment of the Ford automobile and forms no essential part of the persent invention, but is shown and briefly described to make clear the association of the attachment of the present invention therewith to prevent the crank 10 from being operated to start the automobile engine when the engine is operatively connected to the automobile driving mechanism.

In accordance with the present invention means is provided for holding the crank 10 in its inoperative position and this means, in the construction shown, consists of a transversely extending shaft 18 mounted at the front of the automobile and which in the construction shown is supported for rocking movement by the bracket 19 that may be secured to the automobile frame by bolts 20, and this bracket is provided with the spaced arms 21 having upwardly extending ears 22 in which the shaft 18 is rotatably mounted. Movement of the shaft 18 in the direction of its length within the supporting bracket may be prevented by providing the shaft with the collars 23 that may be rigidly secured to the shaft in the desired position of adjustment by the set screws 24. The shaft 18 is provided with the spaced fingers 25 which, in the construction shown, are positioned to straddle a portion of the crank 10. as will be apparent from the drawing, to hold the same so that it cannot be operated to crank the automobile. The spaced fingers 25 are preferably connected by a bridge member 26 and these fingers may be rigidly secured to the shaft 18 by set screws 27 mounted in the lugs formed at the inner ends of the fingers and which are provided with drill holes through which the shaft 18 extends, as will be apparent from the drawing.

The construction shown in the drawing for placing the crank engaging fingers 25 under the control of the brake applying lever 11 consists of the connecting rods 28 which may be disposed at the opposite sides of the automobile beneath the mud guards and adjacent the side beams of the automobile chassis, which beams extend from the front to the rear axles of the automobile. The rear ends of the connecting rods 28 may be secured to the downwardly extending arms 16 above mentioned and the forward ends of these rods are connected to the arms 29 which are fastened to the opposite ends of the shaft 18. The arrangement is such that movement of the brake applying shaft 12 to the brake releasing position in which it is shown in the drawing will pull the connecting rods 28 rearwardly and this will serve to rock the shaft 18 in a direction to engage the fingers 25 with the crank 10 to hold the latter in its inoperative position. Movement of the brake applying lever 11 rearwardly to the brake applying position will push the connecting rods 28 frontwardly and this will rock the fingers 25 downwardly out of engagement with the crank 10 so that the latter may be forced inwardly and rotated to crank the automobile engine. It will be apparent from the foregoing that the automobile attachment forming the subject matter of the present invtntion makes it impossible to operate the crank 10 to turn the automobile engine over unless the brake applying lever 11 has been first moved to the position in which it releases the engine from the automobile driving mechanism, thus eliminating all danger of the person cranking the automobile being run over due to the automobile being driven forward when the engine is started.

What is claimed is:—

1. An automobile attachment for preventing the engine from being cranked while the driving mechanism is operatively connected to the engine, comprising in combination, crank engaging means adapted to hold the engine crank inoperative, a lever operable to effect rotation of the automobile driving mechanism from the engine, and mechanism under the control of said lever and adapted to hold said crank engaging means in its crank holding position as long as said lever is in the automobile driving position.

2. An automobile attachment for preventing the engine from being cranked while the driving mechanism is operatively connected to the engine, comprising in combination, crank engaging means adapted to hold the engine crank inoperative, a lever operable to effect rotation of the automobile driving mechanism from the engine, and a connection between said lever and crank engaging means and operable to move the latter into position to hold the crank inoperative as said lever is moved to the automobile driving position.

3. An automobile attachment for preventing the engine from being cranked while the driving mechanism is operatively connected to the engine, comprising in combination, means for holding the crank in its inoperative position, a lever operable to effect rotation of the automobile driving mechanism from the engine, and means operable by the movement of said lever to shift said crank holding means to and from its crank holding position.

4. In combination with an automobile having a lever operable to effect rotation of the automobile driving mechanism from the engine, and a crank for manually rotating the engine; means mounted adjacent said crank and movable into and out of position to hold the crank inoperative, and a connection between said lever and crank holding means and adapted to maintain said holding means in the position in which it renders the crank inoperative as long as said lever is in the automobile driving position.

5. In combination with an automobile having a lever for applying the automobile brakes, and a crank for manually rotating the engine, means for holding the crank inoperative, and a connection between said lever and crank holding means and adapted to maintain said holding means in its crank holding position when the lever is in the brake released position.

6. In combination with an automobile having a brake actuating shaft extending transversely of the automobile, a lever for rocking said shaft, and a crank for manually rotating the engine; means for holding the crank inoperative, and a connection between said shaft and holding means and adapted to move the latter to and from its crank holding position as the lever is moved to rock the brake applying shaft.

7. An automobile attachment, comprising in combination, a shaft extending transversely of the automobile adjacent the crank for the engine and supported for rocking movement, crank engaging means mounted upon said shaft and adapted to be moved thereby into and out of position to hold the crank inoperative, a brake actuating shaft extending transversely of the automobile, a lever for rotating the brake actuating shaft, and a connecting rod between said shafts for imparting rotative movement from one to the other and adapted to render said crank inoperative as long as the brake applying shaft is in its brake released position.

In testimony whereof, I have signed my name to this specification.

EDWARD A. CUNNIFF.